United States Patent Office 3,452,873
Patented July 1, 1969

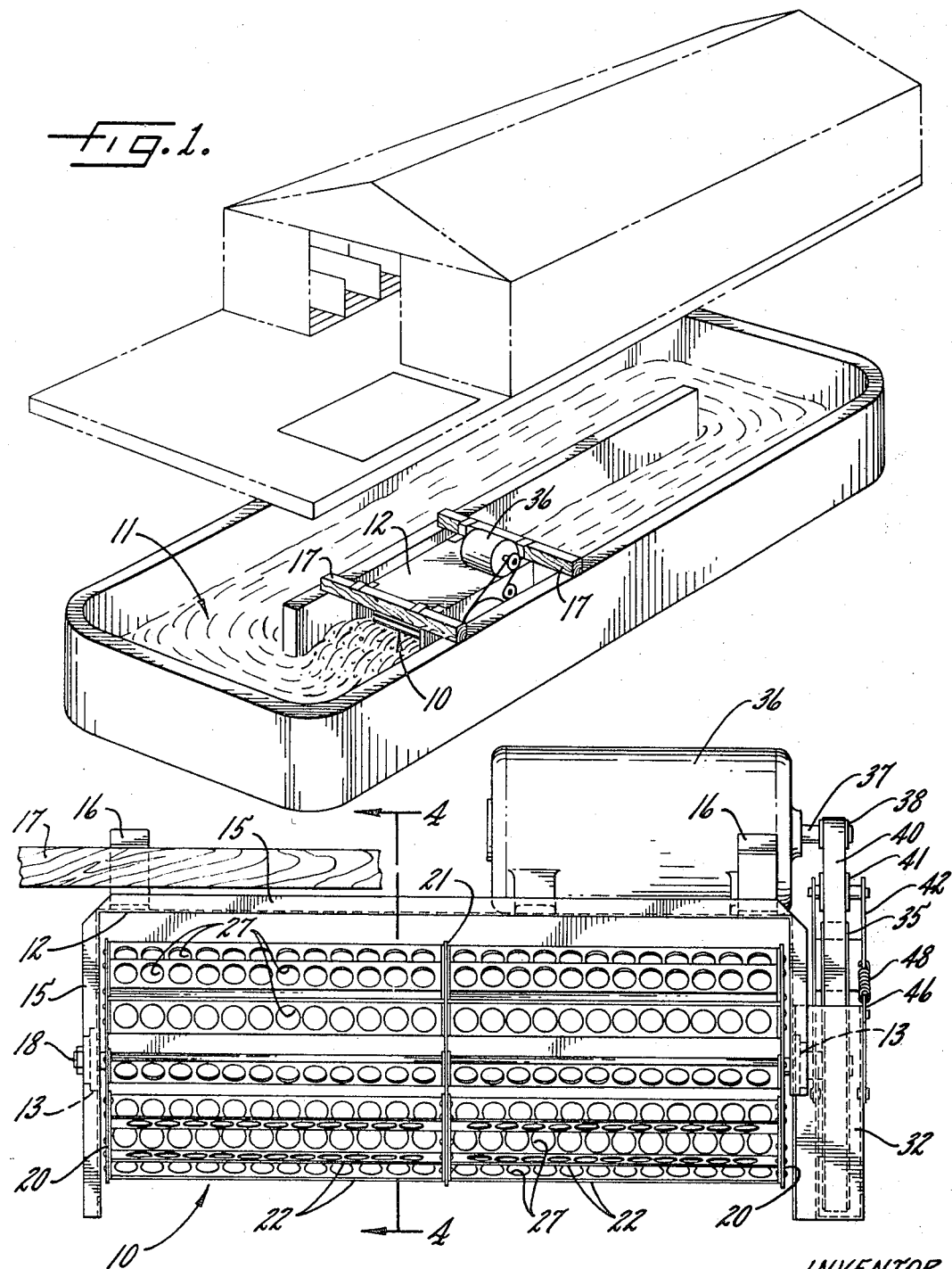

3,452,873
AERATOR FOR SEWAGE TREATMENT SYSTEMS
Ronald S. Blough, Fairfield, Iowa, assignor to Fairfield Engineering and Manufacturing Company, Fairfield, Iowa, a corporation of Iowa
Filed July 24, 1967, Ser. No. 655,511
Int. Cl. C02c 1/10
U.S. Cl. 210—219                                     5 Claims

ABSTRACT OF THE DISCLOSURE

A motorized aerating device is described for oxidation process sewage systems, in which a shrouded drum is partially immersed and rotated to produce aeration, agitation, and movement of the sewage liquid past the aerator.

---

This invention relates to treatment of sewage, and in particular to an aerator for an oridation process sewage treatment system adapted for use in the raising of livestock.

Much attention is currently being given by agricultural engineers to the oxidation ditch, an improved method of handling livestock manure which is totally unlike other methods currently in common use. Essentially, the oxidation ditch is a manure handling system similar to a municipal sewage treatment plant on a much-reduced scale. The manure is introduced into a ditch or trench and combined with liquid to be reduced by bacterial action into components which can be used as fertilizer or else easily disposed of without posing a health hazard or a pollution problem.

The bacterial breakdown of sewage wastes consists basically of two processes: aerobic and anaerobic. The latter process has been used by farmers to a limited extent in manure lagoons, wherein large quantities of stagnant liquid wastes are allowed to be broken down through the action of anaerobic (non-oxygen-requiring) bacteria. While manure will eventually break down and be oxidized in such lagoons, it is accompanied by the production of noxious gases, and has other disadvantages which make such a lagoon uneconomic and undesirable for farm use.

Such wastes can also be broken down by aerobic (oxygen-requiring) bacteria, and such processes have numerous advantages over the anaerobic type. For instance, the aerobic bacteria perform their chemical breakdown of the sewage wastes without the generation of objectionable odors, and a properly designed system can be constructed and used in a relatively sma ll space. The aerobic process does not attract flies and other vermin and the fertilizer value in the processed liquid is also retained. However, aerobic systems require the continuous replenishment of the dissolved oxygen in the sewage wastes so that the aerobic bacteria have a constant supply of oxygen on which to thrive. Constant agitation is also necessary so that sewage particles do not settle out and resist bacterial decomposition.

These requirements have given rise to mechanical aerators and agitators. The designs thus far available for farm use have been patterned after commercial designs used in municipal sewage treatment facilities. Such machines generally consist of a motorized paddle wheel which is partially emersed in the sewage liquid and rotated to beat the liquid into a froth in order to facilitate the dissolving of atmospheric oxygen. The blades on such machines have varied widely, some having a brush-like configuration of radial wires or teeth, while others have had horizontal blade bars disposed in a cylindrical pattern about the rotational axis of the wheel. While these devices have proved effective in introducing dissolved oxygen into the sewage liquid, their action is generally confined only to the immediate surface of the sewage liquid itself.

Dispersion of the dissolved oxygen throughout the large body of tthe sewage liquid in the ditch or tank is then generally accomplished by recirculating the liquid past the aerator, keeping it moving at a steady rate so that mixing is induced. Such mixing is also necessary to prevent sedimentation of solids which would tend to clog the ditch and prevent uniform bacterial action on the body of sewage liquid. In order to prevent such settling from occurring, it has been common practice to rotate existing paddle wheel type aerators at a rate such that the sewage liquid is kept continually moving at a speed of no less than one foot per second. A circular or racetrack-shaped ditch is usually provided so the the liquid is circulated around a continuous path by the action of the aerator wheel.

In consideration of the above requirements, it is a principal objective of the present invention to provide an improved aerator for oxidation process sewage treatment systems which provides for efficient aeration of the sewage liquid and additionally serves to agitate and mix the body of the aerated sewage liquid as it is propelled around a recirculating path. It is particularly contemplated to provide an aerator which is capable of directing a forcible stream of liquid down into the body of the sewage liquid itself to prevent pockets of stagnant liquid and accumulated sediment from developing as the liquid is circulated.

It is further contemplated that the present invention will provide an aerator mechanism of increased efficiency whereby a greater quantity of oxygen may be dissolved in the sewage liquid for a given power input, with increased advantages of enhanced mixing and circulation.

For accomplishing these purposes, it is also an object to provide an aerator mechanism which is simple, strong, relatively inexpensive, and which utilizes a minimum of moving parts which might be susceptible to clogging or corrosion due to the adverse operating environment of the sewage liquid. It is further intended that the aerator of the present invention shall utilize a power transmission means which is adequately protected from this adverse environment, thereby reducing the possibility of corrosion, damage and failure.

Other objects and advantages of the present invention will become apparent upon reading the following detailed description and upon reference to the drawings, in which:

FIG. 1 is an overall perspective of the aerator as it would appear in use in a recirculating oxidation process sewage treatment ditch located beneath a livestock shed;

FIG. 2 is a longitudinal side elevation of the aerator of the present invention, the illustrated unit being shown partially immersed in sewage liquid as it would appear during use;

As shown generally in FIG. 1, the illustrative tank or ditch is constructed in the form of a racetrack-shaped oval, with rounded sides to prevent stagnant pockets which might cause settling out of solid material. The ditch is proportioned to accommodate the wastes of the number of animals to be served, and is designed with sufficient volume to permit the bacterial process to roughly keep pace with the daily addition of animal wastes. To give an example, in a hog-raising operation involving a building containing 100 animals, a total operating liquid volume of 1,000 cubic feet must be accommodate. This volume does not include the freeboard required to allow air space and prevent splashing, so the actual ditch would be somewhat larger than this. In the exemplary installation, a suitable ditch would be two and one-half feet deep with two feet of freeboard, for a total depth of four and one-half feet. The aerator rotor would then span the full ditch width, and would be approximately two and one-half feet wide. For continuous use, with new animal wastes being added and processed material being removed each day, the amount added daily should generally be no more than about 1.5% of the ditch volume. If the ditch is operated on a batch basis, with periodical emptying and cleaning, up to 4% of the ditch volume in animal wastes can be added daily. Occasionally it is also necessary to supplement the liquid content of the ditch with water to insure that the sewage liquid therein is of the proper concentration and consistency for adequate bacterial action.

Figure 3:
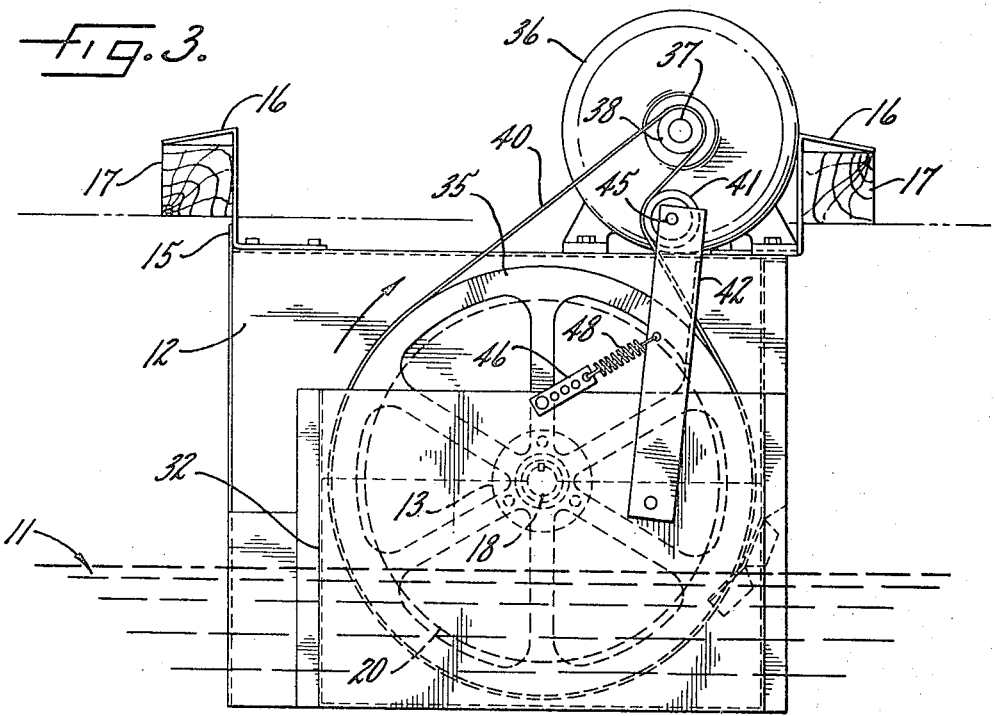
FIG. 3 is a side elevation of the aerator of FIG. 2.
Figure 4:
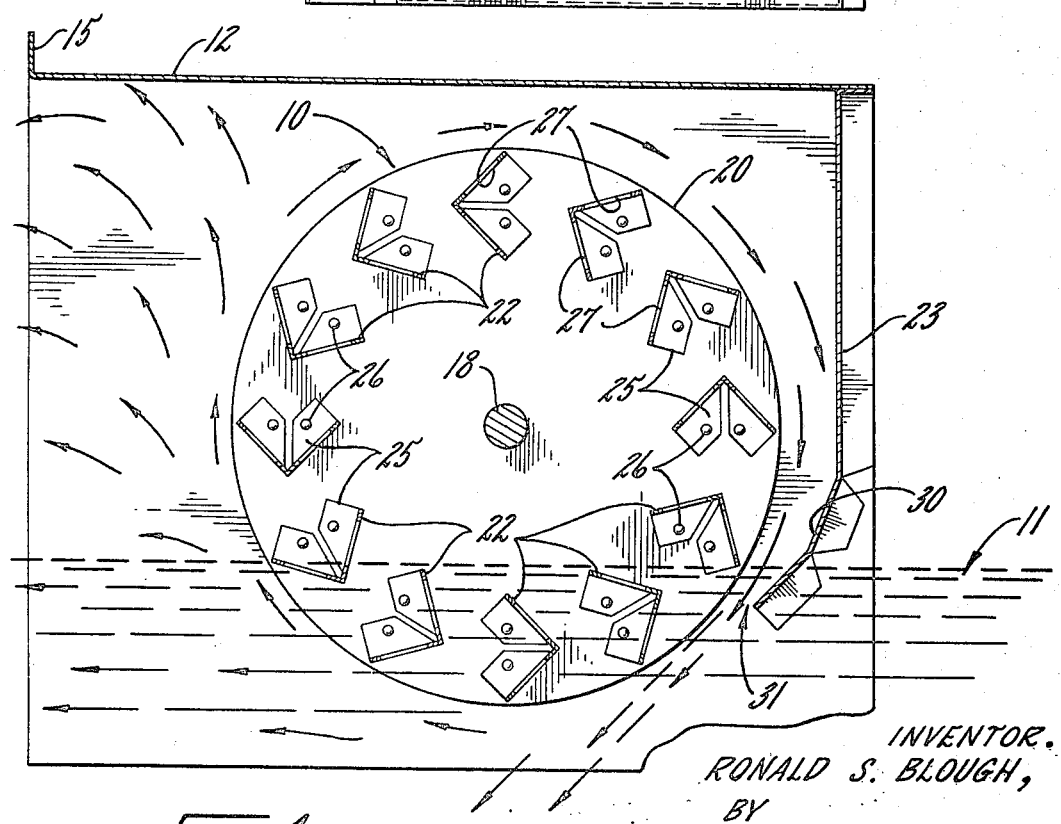
FIG. 4 is an enlarged section taken in the plane 4—4 of FIG. 2.

Turning to FIGS. 2 and 3, there is shown an aerator constructed according to the present invention. A rotatable bladed cylindrical rotor 10 is partially immersed in a body of sewage liquid indicated generally at 11. The rotor 10 is rotatably carried by a frame 12 in journals 13. The journals 13 are preferably of the sealed prelubricated type which may be operated in the sewage liquid 11 without damage. During normal operation, however, the cylindrical rotor 10 is only immersed in the sewage liquid 11 to a depth sufficient to obtain adequate agitation and dissolving of oxygen, and the journals 13 are thus not normally immersed.

The frame 12 in which the cylindrical rotor 10 is carried is preferably constructed of heavy gauge sheet metal, with upturned flanges 15 located about its periphery for added strength. The frame 12 is fitted with four hanger brackets 16 which suspend the aerator mechanism over the sewage trench by engaging a pair of cross-timbers 17. It will be appreciated that the aerator mechanism can thus be simply and easily raised from the confines of the oxidation ditch should servicing be required.

The cylindrical rotor 10 itself is constructed generally in paddle wheel form, but with certain important differences. It comprises a central shaft 18 which engages the journals 13 at each end of the frame 12, and a pair of end plates 20 rigidly secured to the shaft 18. In the illustrative embodiment, additional length is provided the aerator rotor 10 by a central plate 21, allowing the rotor to be constructed in two sections. Each section consists of an end plate 20 and the central plate 21 which carry a plurality of longitudinal aerator blades 22 disposed in a cylindrical pattern about the central shaft 18. The rotor 10 is substantially enclosed above the level of the sewage liquid 11 by a shroud. The broad upper portion of the sheet metal frame 12 serves as an upper shroud member, and a forward or front shroud member 23 is located immediately adjacent the portion of the rotor 10 wherein the aerator blades 22 enter the sewage liquid 11 in normal rotation.

Pursuant to a principal aspect of the invention, the aerator blades 22 and front shroud member 23 are constructed and located so that a substantial stream of liquid is directed from the front of the rotor 10 down into the body sewage liquid 11 to promote mixing and to provide positive forward movement of the sewage liquid past the aerator. For this purpose the individual aerator blades 22 are formed with a concave surface on the advancing side of the blade so that a certain amount of sewage liquid is carried upward by the blades as they emerge from the main body of liquid and over the top of the rotor 10 as it continues to revolve. This liquid which is lifted from the surface and carried over the top of the rotor is referred to herein as carryover liquid, and it will be seen that it plays a significant part in promoting the efficient operation of the aerator apparatus.

To achieve the desired degree of carryover, along with the important allied functions of aerating the liquid and circulating the surface liquid past the aerator, the individual blades 22 are made in a V-shaped cross-section with the open or concave side of the V serving as the advancing edge of the blade. The individual blades 22 are preferably made from sheet metal which is bent on a brake or other suitable tool to provide flanges 25 at each end. The blades 22 are then secured to the plates 21, 20 by rivets 26 or other suitable fastening means. The blades 22 are also provided with evenly spaced perforations 27 to enhance their aerating effect and to allow control of the amount of carryover liquid.

Further in accordance with this aspect of the invention, the front shroud member 23 is provided with a deflector 30 which curves about the forward edge of the rotor 10 adjacent the blades 22 at the point of entrance into the body of sewage liquid 11. The deflector 30 is preferably disposed tangential to the direction of rotation, and the deflector 30 is further positioned so that its lowermost portion is angled in the direction of the desired flow. In operation, the flow of carryover liquid induced by the concave aerator blades 22 is forcibly directed down against the front shroud 23 and the deflector 30. The effect of this forcible impingement of carryover liquid against the deflector 30 is to induce a stream of carryover liquid to issue from the opening 31 between the blade periphery of the rotor 10 and the deflector 30. Because the deflector is angled with respect to the surface of the sewage liquid, the stream of carryover liquid is projected into the sewage liquid in a direction having a substantial velocity component parallel to the surface of the sewage liquid 11, this being preferably in the direction of the desired flow. The effect of this downward stream is to augment the paddle wheel action of the rotor 10 in a manner which causes thorough mixing and agitation to the full depth of sewage liquid 11 rather than of the surface liquid alone. In this way the sewage liquid is thoroughly aerated and mixed throughout its depth each time it passes the aerator, and agitation is enhanced considerably over systems which rely on maintaining flow velocity alone for this purpose.

In practice, it has been found that the deflector 30 may be made simply by forming an extension of the front shroud member 23 on a sheet metal brake, but other means such as separately attached deflectors and guide vanes may also be used without departing from the invention.

As another feature of the invention, the liquid thrown up by the emerging rotor blades 22 is contained and forcibly directed rearwardly of the aerator, rather than being free to splatter in an unrestrained manner. The horizontal upper portion of the frame 12 comprises the top member of the shroud and, together with the frame side panel member, extends behind the aerator rotor 10 to form a short discharge duct which diverts a thrown stream of liquid in a rearward direction. The extension of the frame 12 forming the top member of the shroud also assists in containing and directing the carryover liquid previously referred to, and insures that it is carried around the periphery of the rotor 10 to be directed at the deflector 30 as heretofore described.

In accordance with a further aspect of the invention, the power transmission means by which the aerator rotor 10 is rotated is itself protected against damage and corrosion by a casing 32. The casing 32 consists of a flanged sheet metal box open at the top and carried by the frame 12 and it itself partially immersed in the body of sewage liquid 11. In the illustrated embodiment, the casing 32 is constructed of welded sheet metal with the frame 12 itself serving as one side of the open-ended box.

For power transmission purposes, one end of the central rotor shaft 18 of the rotor 10 extends through its supporting journal 13 into the interior of the casing 32. On this end of the shaft 18 is carried a rotor pulley 35 by which the rotor 10 may be driven. Mounted above the frame 12 and behind the protective shield provided by the upper portion of the frame 12 and the front shroud member 23 is a drive motor 36. The drive motor 36 has at one end a drive shaft 37 carrying a drive pulley 38, and connecting the drive pulley 38 and the rotor pulley 35 is a drive belt 40. On the retreating side of the drive belt in normal operation as it leaves the drive pulley 38 to drive belt is tensioned by a tensioner pulley 41. This pulley is carried by a tensioning arm 42 actuated by a tensioning spring 48 anchored to the body of the casing 32. The tensioner arm 42 in the illustrated embodiment is a channel-section structure of sheet metal carrying the tensioner pulley 41 on a pivot 45. The tensioning spring 48 is preferably anchored to the casing 32 by means of an adjusting plate 46 having a plurality of mounting holes by which the plate may be anchored to the casing 32 at different points to vary the tension on the drive belt 40.

In operation, the open upper end of the casing 32 is maintained well above the surface of the sewage liquid 11 so that no spillage is encountered which might enter the casing 32. The rotor pulley 35 and drive belt 40 which operate below the level of the sewage liquid 11 are thereby protected by the casing 32 against immersion and the detrimental effects which contact with the sewage liquid might cause.

In a typical installation, an aerator rotor 10 of the design of the present invention would have 12 blades 22, equally spaced about the periphery of a 16″ diameter drum. The rotor 10 would normally be operated at about 200 r.p.m. The aeration supplied by this device may be varied by changing the speed of the rotor 10, or by varying the amount of immersion of the device into the body of sewage liquid 11. As a practical matter, it is inconvenient to vary the rotational speed of the drive motor 36, and so it may be assumed for most purposes that the rotational speed of the aerator motor 10 is fixed. However, adequate control of the aeration process can still be achieved by either raising or lowering the entire device with respect to the body of sewage liquid 11, or more simply by adding or removing liquid from the ditch so as to change the level of the sewage liquid 11 with respect to the rotor 10. As the level rises, the degree of aeration is increased, and as the level falls the aeration is decreased until the rotor 10 no longer makes contact with the sewage liquid at all.

I claim as my invention:

1. In an oxidation process sewage treatment system having an open ditch containing sewage liquid, an aeration apparatus comprising in combination a frame, a cylindrical rotor journaled to said frame and having an axis of rotation parallel to the surface of said sewage liquid, said rotor having a plurality of peripherally disposed aerating blades immersible in said sewage liquid, each of said blades having an open surface on the advancing side of said blade with respect to said sewage liquid whereby carryover liquid is obtained, power means for rotating said rotor, means defining a shroud closely enclosing the periphery of said rotor above the level of said sewage liquid, said shroud having a top panel member overlying said rotor and a front panel member adjacent the point of entrance of said blades into said sewage liquid, and said front panel member having a deflector directed substantially tangential to the direction of blade rotation whereby carryover liquid from said rotor is projected downward into said sewage liquid in a direction having a substantial velocity component parallel to the surface of said sewage liquid.

2. In an oxidation process sewage treatment system having an open ditch containing sewage liquid, an aeration apparatus comprising in combination a frame, a cylindrical rotor journaled to said frame and having an axis of rotation parallel to the surface of said sewage liquid, said rotor having a plurality of peripherally disposed aerating blades immersible in said sewage liquid, each of said blades having an open surface on the advancing side of said blade with respect to said sewage liquid whereby carryover liquid is obtained, power means for rotating said rotor, means defining a shroud closely enclosing the periphery of said rotor above the level of said sewage liquid, said shroud having a top panel member and side panel members enclosing said rotor to define a rearwardly directed discharge duct and a front panel member adjacent the point of entrance of said blades into said sewage liquid, and said front panel member having a deflector directed substantially tangential to the direction of blade rotation whereby carryover liquid from said rotor is projected downward into said sewage liquid in a direction having a substantial velocity component parallel to the surface of said sewage liquid.

3. The apparatus defined in claim 1 in which said power means comprises in combination a motor affixed to said frame, a first pulley driven by said motor, a second pulley drivably connected to said rotor, power transmission means drivingly interconnecting said first and second pulleys, and means defining a casing surrounding said second pulley and enclosing said second pulley and power transmission means against immersion contact with said sewage liquid.

4. The apparatus defined in claim 3 in which each of said aerator blades comprises a bar having a substantially V-shped section, said bar being disposed parallel to the rotational axis of said rotor.

5. The apparatus defined in claim 4 in which said bar is uniformly perforated throughout its length.

References Cited

UNITED STATES PATENTS

| 1,803,792 | 5/1931 | Christensen | 261—92 |
| 3,198,000 | 8/1965 | Schlageter | 261—92 X |
| 3,322,410 | 5/1967 | Ahlenius | 210—219 X |
| 3,336,016 | 8/1967 | Schreiber | 261—123 |

FOREIGN PATENTS

| 262 | 1897 | Great Britain. |
| 2,113 | 1909 | Great Britain. |

REUBEN FRIEDMAN, Primary Examiner.

J. L. DeCESARE, Assistant Examiner.

U.S. Cl. X.R.

261—92